(12) United States Patent
Seeley et al.

(10) Patent No.: US 8,888,900 B2
(45) Date of Patent: Nov. 18, 2014

(54) APPARATUS FOR TREATING GAS

(75) Inventors: Andrew James Seeley, Bristol (GB); Andrew James Wakefield, Bristol (GB)

(73) Assignee: Edwards Limited, West Sussex (GB)

( * ) Notice: Subject to any disclaimer, the term of this patent is extended or adjusted under 35 U.S.C. 154(b) by 1108 days.

(21) Appl. No.: 12/599,681

(22) PCT Filed: May 15, 2008

(86) PCT No.: PCT/GB2008/050353
§ 371 (c)(1),
(2), (4) Date: May 19, 2010

(87) PCT Pub. No.: WO2008/142441
PCT Pub. Date: Nov. 27, 2008

(65) Prior Publication Data
US 2010/0303676 A1    Dec. 2, 2010

(30) Foreign Application Priority Data

May 18, 2007   (GB) .................................. 0709502.9

(51) Int. Cl.
| | | |
|---|---|---|
| *B03C 3/00* | (2006.01) | |
| *B03C 3/16* | (2006.01) | |
| *B01D 53/14* | (2006.01) | |
| *B01D 47/00* | (2006.01) | |
| *B01D 47/06* | (2006.01) | |
| *B03C 3/014* | (2006.01) | |
| *B03C 3/53* | (2006.01) | |
| *B03C 3/49* | (2006.01) | |
| *B01D 47/14* | (2006.01) | |

(52) U.S. Cl.
CPC ............ *B03C 3/014* (2013.01); *B03C 2201/10* (2013.01); *B03C 2201/08* (2013.01); *B01J 2219/315* (2013.01); *B03C 3/53* (2013.01); *B03C 3/49* (2013.01); *B01D 47/14* (2013.01); *B03C 3/16* (2013.01)
USPC ..................................... 96/52; 96/53; 96/290

(58) Field of Classification Search
None
See application file for complete search history.

(56) References Cited

U.S. PATENT DOCUMENTS 4,256,468 A * 3/1981 Mazer et al. ..................... 95/65
4,305,909 A * 12/1981 Willett et al. ................. 422/169

(Continued)

FOREIGN PATENT DOCUMENTS

| CN | 1326767 A | 12/2001 |
|---|---|---|
| GB | 1049470 | 10/1964 |

(Continued)

OTHER PUBLICATIONS

Citing the definition of "beneath" as found in Free Online Dictionary. www.thefreedictionary.com/beneath (Sep. 18, 2013).*

(Continued)

*Primary Examiner* — Duane Smith
*Assistant Examiner* — Pankti Patel
(74) *Attorney, Agent, or Firm* — Shumaker & Sieffert, P.A.

(57) ABSTRACT

Apparatus for treating gas comprises a casing (100) containing a gas scrubber section (118) and an electrostatic precipitator section (120) located above the scrubber section. A partition (136) may be located within the casing (100) to separate the precipitator section (120) from the scrubber section (118). The casing has a gas inlet (102) for supplying gas to the scrubber section, a gas outlet (104) for exhausting gas from the precipitator section, a scrubbing liquid inlet (106) for supplying scrubbing liquid to the precipitator section, and a scrubbing liquid outlet (126) for draining scrubbing liquid from the scrubber section. In one embodiment the partition comprises a set of apertures (138) through which scrubbing liquid drains from the precipitator section into the scrubber section, and a set of gas passages (140) for conveying gas from the scrubber section to the precipitator section.

24 Claims, 11 Drawing Sheets

(56) References Cited

U.S. PATENT DOCUMENTS

| | | | |
|---|---|---|---|
| 5,391,220 A * | 2/1995 | Patterson | 95/69 |
| 6,110,256 A * | 8/2000 | Reynolds et al. | 95/4 |
| 2002/0009793 A1 | 1/2002 | Wieser-Linhart | |
| 2005/0013757 A1 | 1/2005 | Windschmitt et al. | |
| 2006/0261265 A1 * | 11/2006 | Ray et al. | 250/281 |

FOREIGN PATENT DOCUMENTS

| | | |
|---|---|---|
| GB | 1049470 | 11/1966 |
| WO | 9518664 A1 | 7/1995 |
| WO | 2006094174 A2 | 9/2006 |

OTHER PUBLICATIONS

Citing definition of "wet electrostic preciptator" at www.ppcbio.com/ppcwespworks.htm.*

Citing definition of "wet electrostic preciptator" at www.hitachi-pt.com/products/energy/dustcollection/wet_type/index.html.*

Citing definition of "wet electrostic preciptator" at www.tri-mer.com/wet-ESP.html.*

English Translation of the Notice of Preliminary Rejection mailed Jan. 3, 2014 received in corresponding Korean Patent Application No. 2009-7023950, 5 pgs.

Office Action mailed Aug. 6, 2014 in counterpart Canadian Application No. 2,686,956, 2 pgs.

* cited by examiner

APPARATUS FOR TREATING GAS

FIELD OF THE INVENTION

The present invention relates to apparatus for treating gas, and finds particular use in the treatment of gas containing solid particles, such as $SiO_2$, and acidic gases, such as HCl.

BACKGROUND

Epitaxial deposition processes are increasingly used for high-speed semiconductor devices, both for silicon and compound semiconductor applications. An epitaxial layer is a carefully grown, single crystal silicon film. Epitaxial deposition utilizes a silicon source gas, typically silane or one of the chlorosilane compounds, such as trichlorosilane or dichlorosilane, in a hydrogen atmosphere at high temperature, typically around 800-1100° C., and under a vacuum condition. Epitaxial deposition processes are often doped with small amounts of boron, phosphorus, arsenic, germanium or carbon, as required, for the device being fabricated. Etching gases supplied to a process chamber may include halocompounds such as HCl, HBr, $BCl_3$, $Cl_2$ and $Br_2$, and combinations thereof. Hydrogen chloride (HCl) or another halocompound, such as $SF_6$ or $NF_3$, may be used to clean the chamber between process runs.

In such processes, only a small proportion of the gas supplied to the process chamber is consumed within the chamber, and so a high proportion of the gas supplied to the chamber is exhausted from the chamber, together with solid and gaseous by-products from the process occurring within the chamber. A process tool typically has a plurality of process chambers, each of which may be at respective different stage in a deposition, etching or cleaning process. Therefore, during processing a waste stream formed from a combination of the gases exhausted from the chambers may have various different compositions.

Before the waste stream is vented into the atmosphere, it is treated to remove selected gases and solid particles therefrom. Acid gases such as HF and HCl are commonly removed from a gas stream using a packed tower scrubber, in which the acid gases are taken into solution by a scrubbing liquid flowing through the scrubber. Silane is pyrophoric, and so before the waste stream is conveyed through the scrubber it is common practice for the waste stream to be conveyed through a thermal incinerator to react silane or other pyrophoric gas present within the waste stream with air. Any perfluorocompounds such as $NF_3$ may also be converted into HF within the incinerator.

When silane burns, large amounts of silica ($SiO_2$) particles are generated. Whilst many of these particles may be taken into suspension by the scrubbing liquid within the packed tower scrubber, it has been observed that the capture of relatively smaller particles (for example, having a size less than 1 micron) by the scrubbing liquid is relatively poor. In view of this, it is known, for example from U.S. 2005/0123461, to provide an electrostatic precipitator downstream from the scrubber to remove these smaller particles from the waste stream.

FIG. 10 illustrates a known arrangement of a scrubber 10 and an electrostatic precipitator 12 for removing solid particulates from a gas stream. A first compartment 14 of the scrubber 10 contains a packed tower 16 of packing material irrigated by a scrubbing liquid, usually water, which is received at a water inlet 18 and sprayed on to the packed tower 16. A sieve plate 20 supporting the packed tower 16 drains scrubbing liquid from the packed tower 14 into a second compartment 22 of the scrubber 10. A drain element 24 drains the scrubbing liquid from the second compartment 22 for recirculation back to the water inlet 18.

A gas inlet 26 conveys the gas stream into the second compartment 22 of the scrubber 10. The gas passes upwards through the holes of the sieve plate 20 into the first compartment 14, wherein acidic gases and the larger solid particulates contained in the gas stream are transferred to the scrubbing liquid passing downwards over the packing material. The scrubbed gas leaves the scrubber 10 through gas outlet 28 located at the top of the first compartment 14, and is conveyed by the gas outlet 30 to the gas inlet of the electrostatic precipitator 12.

The electrostatic precipitator 12 contains two electrostatic chambers 34, 36 each connected at a lower end thereof to an intermediate chamber 38 that conveys the gas from the bottom of one electrostatic chamber 34 to the bottom of the other electrostatic chamber 36. Each electrostatic chamber 34, 36 comprises a centrally located, inner electrode 40 and an outer electrode 42 surrounding the inner electrode 40 and which may be provided by an electrically conducting wall of the chamber 34, 36. Each electrostatic chamber 34, 36 also has a water inlet 44 to which a flow of water is supplied to produce a "curtain" of water flowing downwards around the inner surface of the outer electrode 42 and into the intermediate component 38. A drain element 46 drains the water from the intermediate compartment 38 for recirculation back to the water inlets 44.

The gas inlet 30 is arranged to convey gas to the top of electrostatic chamber 34, and a gas outlet 48 is arranged to convey gas out from the top of electrostatic chamber 36.

During use, a high voltage is applied to each of the inner electrodes 40 to produce an electrostatically charged field, or corona, between the inner and outer electrodes 40, 42 of each electrostatic chamber 34, 36. As the gas passes through the corona, any particulates contained in the gas become electrically charged and are drawn towards the outer electrode 42, where the particulates enter the water curtain and are washed into the intermediate chamber 38. The electrostatic chamber 34, in which the gas flows downwards through the chamber 34 with the water curtain, serves to remove solid particulates from the gas, whilst the electrostatic chamber 36, in which the gas flows upwards against the water flow, serves to remove the finer solid particulates and any water droplets from the gas.

Two separate water recirculation systems are required to provide scrubbing liquid, or water, to both the scrubber 10 and the electrostatic precipitator. Each of these recirculation systems may also include a water treatment unit for removing acidic species from the water prior to its re-use, and this can contribute towards relatively high costs associated with operating the gas treatment apparatus.

SUMMARY

The present invention provides apparatus for treating gas, the apparatus comprising a casing, a gas scrubber section located within the casing, the casing having a gas inlet for supplying gas to the scrubber section, and an electrostatic precipitator section positioned within the casing to receive gas from the scrubber section, the casing having a gas outlet for exhausting gas from the precipitator section and a scrubbing liquid inlet for supplying is scrubbing liquid to the precipitator section, the scrubber section being positioned within the casing to receive scrubbing liquid from the precipitator section, the casing having a scrubbing liquid outlet for draining scrubbing liquid from the scrubber section.

The provision of the scrubbing section and the precipitator section within a common casing can provide a simple and cost-effective apparatus for treating a gas to remove acid gases and solid particles therefrom. These two sections may share a common source of scrubbing liquid from which scrubbing liquid is supplied to the precipitation section. The scrubbing liquid is received by the scrubbing section from the precipitation section, and is drained from the scrubbing section through the scrubbing liquid outlet. This scrubbing liquid may be recirculated back to the scrubbing liquid inlet, and so only one recirculation loop would be required, in contrast to the two recirculation loops required in the aforementioned prior art.

The scrubber section is preferably located beneath the precipitator section, thereby significantly reducing the foot-print of the gas treatment apparatus.

This can also enable the scrubbing liquid to drain under gravity from the precipitator section to the scrubber section without the need to provide a fluid pump to urge the scrubbing liquid from one section to the other.

The scrubber section and the precipitator section may be located within a common component of the casing. Alternatively, these sections may be located within respective components of the casing, which may be connected together using a clamp or other connecting device. In either of the above configurations, the gas inlet may be located within another component of the casing connected to, preferably directly beneath, the component of the casing within which the scrubber section is positioned. A drain for draining scrubbing liquid from the casing may receive scrubbing liquid from that component of the casing. A perforated plate may be held between the component of the casing in which the scrubber section is located and the component of the casing in which the drain is located to provide the aforementioned scrubbing liquid outlet for draining scrubbing liquid from the scrubber section. This plate may be integral with the scrubber section component of the casing. Alternatively, the scrubbing liquid outlet may be configured to drain scrubbing liquid from the casing directly from the scrubber section.

The casing is preferably tubular, more preferably substantially cylindrical, and the scrubbing liquid inlet is preferably arranged to supply scrubbing liquid tangentially into the precipitator section. This can generate a "curtain" of scrubbing liquid around the inner wall of an outer electrode of the precipitator section. This curtain serves to capture particulates drawn towards that wall by the electric field generated by the precipitator section during use, and to prevent deposits forming on the inner wall of the outer electrode.

The outer electrode of the precipitator section may be provided in the form of a sleeve inserted into the precipitator section of the casing. In this case, the casing may be made from plastics or other non-electrically conductive material. Alternatively, the casing (or at least that component of the casing containing the precipitator section) may be formed from electrically conductive material, for example stainless steel, to enable that part of the casing to provide the outer electrode of the precipitator section.

The apparatus preferably comprises a partition dividing the casing into the scrubber section and the precipitator section. This partition may be a substantially planar member attached to the casing, and which may be clamped or otherwise held between two components of the casing. Alternatively, the partition may be connected to the outer electrode of the precipitator section. As another alternative, the partition may be connected to, or integral with, the component of the casing within which the scrubber section is positioned, or the component of the casing within which the precipitator section is positioned.

When the precipitator section is located above the scrubber section, the partition may be substantially horizontal. For a cylindrical casing, the partition may be substantially perpendicular to the axis of the casing.

External piping may be used to convey the gas from the scrubber section to the precipitator section, thereby enabling the gas to be conveyed around the partition from one section to the other. However, such piping may be prone to blockage by solid particles that have not been removed from the gas by the scrubber section. Therefore, means for conveying gas from the scrubber section to the precipitator section is preferably formed in the partition so that the gas passes through the partition from the scrubber section into the precipitator section, and so no external piping is required. Furthermore, when the precipitator section is located above the scrubbing section, there are only relatively low conductance losses associated with the passage of the gas stream upwards through the partition into the precipitator section.

As discussed above, the scrubber section and the precipitator section may be provided in a common component of the casing, within which a partition is provided to divide this component of the casing into these two sections. Alternatively, each section may be located within a separate component of the casing, with these two components being connected together by a clamp or other connecting device. The means for conveying the gas from the scrubber section to the precipitator section may then be formed in adjoining walls of these two components, which walls provide the partition between the scrubber section and the precipitator section. In another alternative, the component of the casing housing the scrubber section may have an open mouth or aperture that is closed by a wall or base of the component of the casing housing the precipitator section when those components of the casing are connected together. In this case, the aforementioned wall or base would provide the partition between the two sections, and include the means for conveying gas from the scrubber section to the precipitator section.

External piping may be used to convey the scrubbing liquid from the precipitator section to the scrubbing section, thereby enabling the scrubbing liquid to be conveyed around the partition from one section to the other. However, it is preferred that the partition comprises means for conveying scrubbing liquid from the precipitator section to the scrubber section, thereby dispensing with the need to provide any external piping for conveying liquid or gas from one section to the other.

The means for conveying scrubbing liquid from the precipitator section to the scrubber section may comprise a plurality of apertures formed in the partition, and through which the scrubbing liquid drains from the precipitator section into the scrubbing section. The partition may be perforated with apertures so that the scrubbing section is showered with scrubbing liquid draining from the precipitator section. The scrubber section may comprise packing material, and so the provision of a perforated partition between the two sections can provide for relatively even irrigation of the material in the scrubbing section.

The means for conveying gas from the scrubber section to the precipitator section preferably comprises a plurality of gas passages formed in the partition. These gas passages may be interspersed amongst the aforementioned apertures, or located in a dedicated part of the partition. In the preferred embodiment, the gas passages are configured to supply gas into the precipitator section above the apertures. For example, each gas passage may comprise a pipe or tube extending from the partition into the precipitator section. This can enable the gas to enter the precipitator section above a volume of scrubbing liquid that may have settled on the partition.

In the event that the scrubbing section has a greater scrubbing liquid requirement than the precipitator section, the casing may be provided with an additional scrubbing liquid inlet for supplying scrubbing liquid to the scrubbing section, and which may be configured to spray scrubbing liquid into the scrubbing section.

A plurality of electrostatic precipitator sections may be positioned within the casing to receive gas from the scrubbing section. These precipitator sections may be arranged in series or in parallel. The casing may be provided with a single partition for separating the plurality of precipitator sections from the scrubber section, or with a plurality of partitions each for separating a respective precipitator section from the scrubber section. Each of these partitions may be connected to, or integral with, an outer electrode of its precipitator section. The precipitator sections may also be arranged concentrically within the precipitator chamber and comprise an inner collecting electrode and outer collecting electrode with a corresponding electrode assembly positioned co-axially there between to facilitate apparatus with larger volumetric capacity without a corresponding large increase in apparatus size.

BRIEF DESCRIPTION OF THE DRAWINGS

Preferred features of the present invention will now be described, by way of example only, with reference to the accompanying drawings, in which.

DETAILED DESCRIPTION

Figure 1:
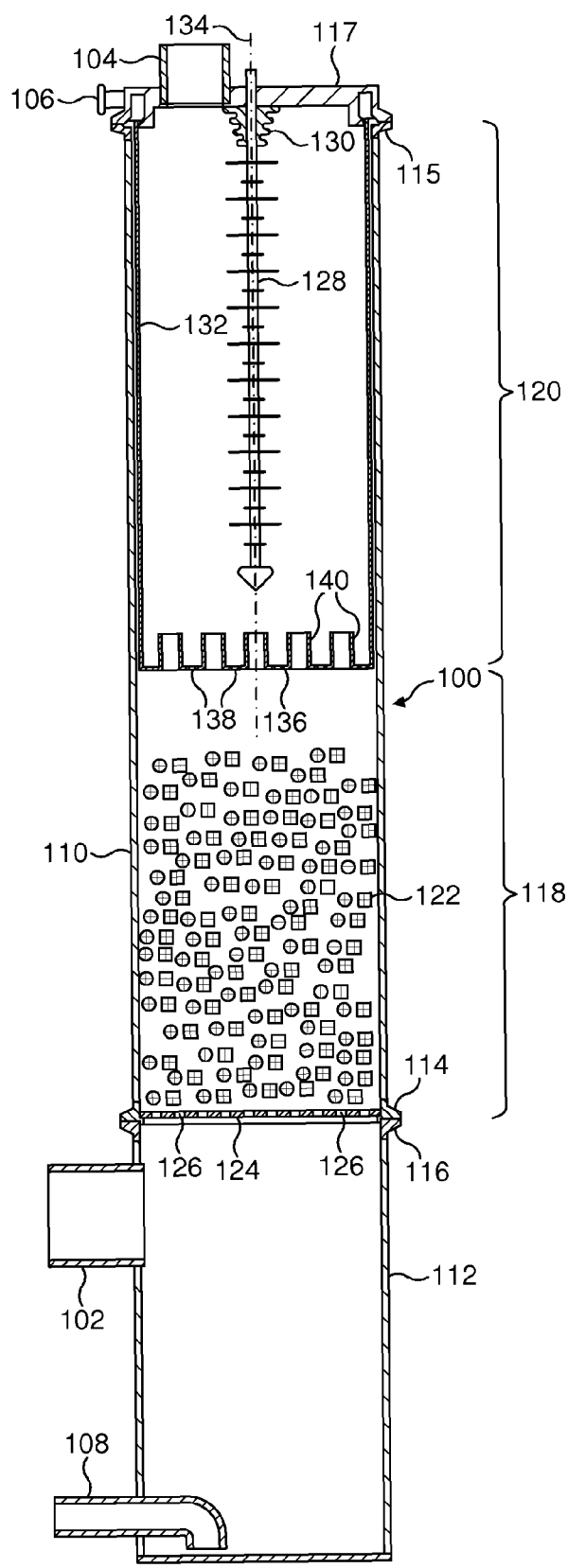
FIG. 1 illustrates a vertical cross-section through a first embodiment of an apparatus for treating gas.

FIG. 1 illustrates a vertical cross-section through a first embodiment of an apparatus for treating gas. The apparatus comprises a tubular, preferably substantially cylindrical, casing 100 having a gas inlet 102 located towards one end of the casing 100 for receiving the gas to be treated, and a gas outlet 104 located towards the other end of the casing 100 for exhausting treated gas from the casing 100. The casing 100 further comprises a scrubbing liquid inlet 106 for receiving a scrubbing liquid, for example water, and a drain element 108 from which the scrubbing liquid is drained from the casing 100 for treatment and return to the scrubbing liquid inlet 106. As illustrated in FIG. 1, the scrubbing liquid inlet 106 is preferably located adjacent the gas outlet 104 towards the upper (as illustrated) end of the casing 100, with the drain element 108 being located towards the lower (as illustrated) end of the casing 100.

In this first embodiment, the casing 100 comprises a first component 110 and a second component 112 connected to the first component 110, for example using a clamp located about flanges 114, 116 of these components 110, 112. Each of these components 110, 112 may be formed from plastics or other non-electrically conductive material. A lid 117 of the casing 100, in which the gas outlet 104 is formed, is secured to a flange 115 of the open upper end of the first component 110 of the casing 100.

The first component 110 houses a gas scrubber section 118 and an electrostatic precipitator section 120 for treating gas passing through the casing 100. These sections 118, 120 are positioned within the first component 110 of the casing 100 so that the gas passes through the scrubber section 118 before passing through the precipitator section 120. Depending on the geometry of casing 100, the precipitator section 120 may be located to the side of, or at an angle to, the scrubber section 118, with suitable gas piping being provided, or the casing 100 being configured, to convey gas from one section to the other. However, as discussed in more detail below, the precipitator section 120 is preferably positioned above the scrubber section 118.

The scrubber section 118 comprises a packed tower 122 of packing material. The packing material is supported by a sieve plate 124 having a plurality of apertures 126, and which is connected to, or integral with, the first component 110 of the casing 100.

The precipitator section 120 comprises a centrally located, inner electrode 128 mounted in an electrically insulating holder 130 depending from the lid 117 so that the inner electrode 128 extends into the precipitator section 120. The inner electrode 128 is surrounded by an outer electrode 132 which in this embodiment is in the form of an electrically conducting sleeve. The upper open end of the outer electrode 132 is welded to a flange or collar, which is located in a groove cut in the flange 115 of the first component of the casing 100 so that the outer electrode 132 hangs from the flange 115 into the casing 100.

In use, the outer surface 132 is maintained at electrical ground (0 V). A lead 134 connects the inner electrode 128 with a power supply (not shown) for applying an electric potential in the range from 20 to 50 kV, preferably in the range from 40 to 50 kV, between the electrodes 128, 132. The scrubbing liquid inlet 106 is arranged to supply scrubbing liquid tangentially into the top of the outer electrode 132 to generate a curtain or "swirl" of scrubbing liquid about the inner wall of the outer electrode 132.

A partition 136 is provided within the casing 100 to divide the casing 100 into the scrubber section 118 and the precipitator section 120. In this embodiment, the partition 136 is provided by a substantially planar plate welded or otherwise connected to the open, lower (as illustrated) end of the outer electrode 132.

In this first embodiment, both gas and scrubbing liquid pass from one section to the other section through the partition 136. In other words, gas passes through the partition 136 from the scrubbing section 118 to the precipitator section 120, and scrubbing liquid passes through the partition 136 from the precipitator section 120 to the scrubbing section 118. The partition is provided with a plurality of apertures 138 through which the scrubbing liquid drains from the precipitator section 120 into the scrubbing section 118. These apertures 138 may be arranged in a number of concentric circular arrays extending about the longitudinal axis of the casing 100 so that the packing material of the packed tower is relatively evenly showered with scrubbing liquid draining from the precipitator section 120. Consequently, with the scrubbing section 118 being positioned immediately beneath the precipitator section 120, there is no need to provide any other internal or external piping to convey scrubbing liquid from one section to the other.

Each of the apertures 126 of the sieve plate 124 provides a scrubbing liquid outlet for draining scrubbing liquid from the scrubbing section 118 into the second component 112 of the casing 100, from which the scrubbing liquid is drained by drain element 108.

The partition 136 comprises one or more gas passages through which gas is conveyed from the scrubbing section 120 to the precipitator section 118. Depending on the rate at which scrubbing liquid drains through the partition 136 into the precipitator section 120, a volume of scrubbing liquid may form on the top surface of the partition 136. In view of this, each gas passage is preferably provided in the form of a pipe 140 extending from the partition 136 into the precipitator section 120 above the maximum level for the volume of scrubbing liquid forming on the partition 136. This can enable the gas to be conveyed into the precipitator section 120 without the entrainment of excessive amounts of scrubbing liquid therein.

In use, gas enters the casing 100 through gas inlet 102, and proceeds upwards (as illustrated) through the apertures 126 of the sieve plate 124 into the scrubbing section 118. The gas passes upwards through the scrubbing section 118 against the flow of scrubbing liquid showering on to the packing material from the partition 136. Within the scrubbing section 118, acid gases, such as HF or HCl, and relatively large solid particulates are transferred to the scrubbing liquid. The scrubbed gas leaves the scrubbing section 118 through the pipes 140 and enters the precipitator section 120. The gas passes upwards between the inner and outer electrodes 128, 132, again against the flow of scrubbing liquid passing over the inner wall of the outer electrode 132. The potential difference between the electrodes 128, 132 generates a corona, which charges any solid particulates remaining in the gas, and these charged species are drawn towards the outer electrode, where they become entrained within the curtain of scrubbing liquid formed on the inner wall of the outer electrode 132. Furthermore, any droplets of scrubbing liquid entrained within the scrubbed gas entering the precipitator section are captured by the curtain of scrubbing liquid. The thus-treated gas stream is subsequently exhausted from the casing 100 through gas outlet 104.

The scrubbing liquid, bearing both solid particulates and acidic species (when both are present in the gas entering the casing 100) drains from the scrubber section 118 into the second component 112 of the casing 100 through the apertures 126 in the sieve plate 124. The scrubbing liquid is drained from that component 112 by the drain element 108, and conveyed to a treatment apparatus (not shown), which is preferably located in the vicinity of the casing 100, for the removal of the acidic species and solid particulates from the scrubbing liquid. For example, one or more filters may be used to remove the particulates from the scrubbing liquid, and an ion exchange apparatus may be used to remove the acidic species from the scrubbing liquid. The thus-treated scrubbing liquid is returned to the scrubbing liquid inlet 106 for re-use.

Figure 10:
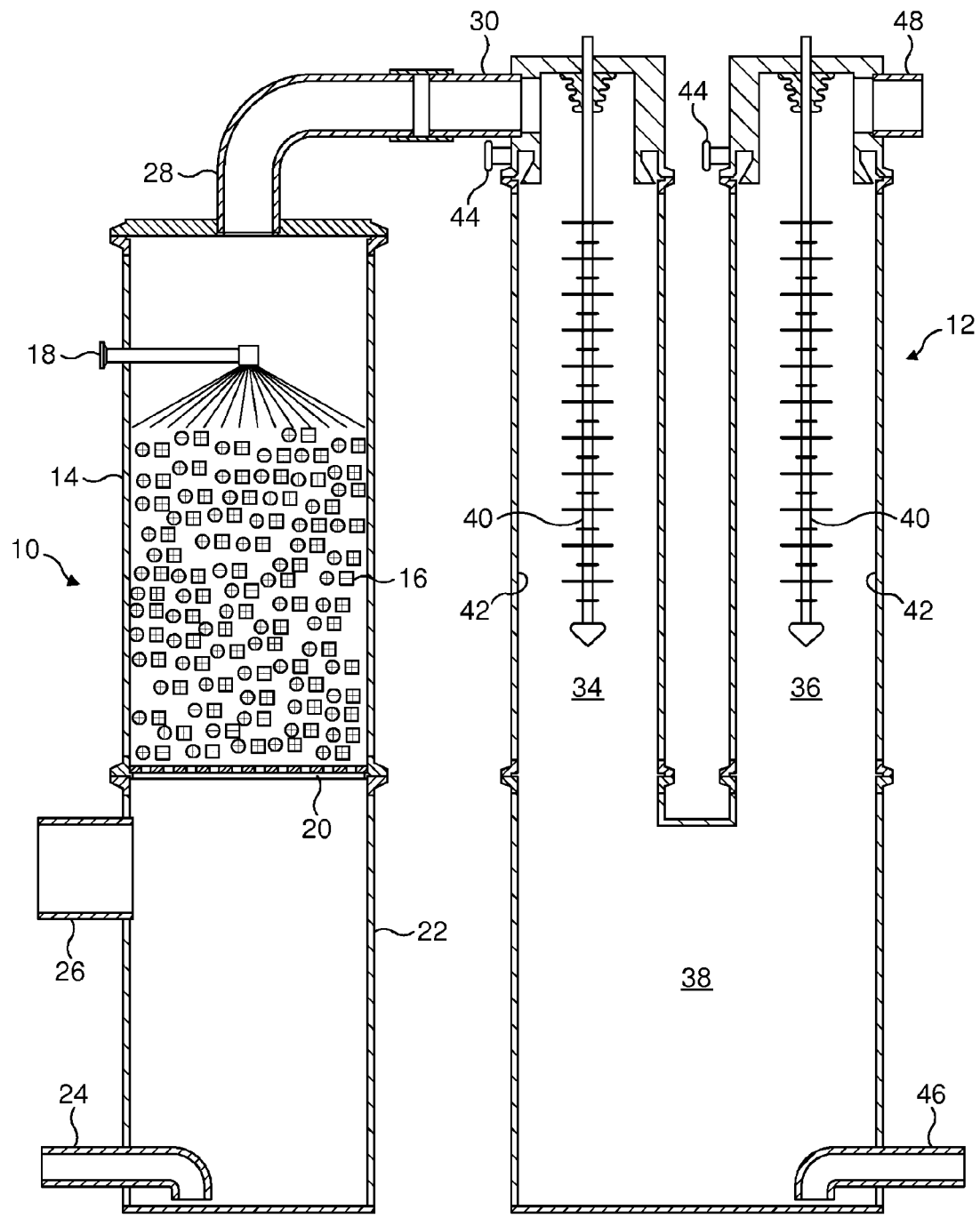
FIG. 10 illustrates a vertical cross-section through a known apparatus for treating gas.

In comparison to the apparatus illustrated in FIG. 10, the foot-print of the apparatus illustrated in FIG. 1 is considerably smaller, and there is only one to liquid recirculation system required. Furthermore, the holder 130 of the inner electrode 128 is positioned in a much cleaner environment than the holder of the electrode 40 of electrostatic chamber 34, and so there will be substantially no build-up of particulates on the holder 130.

Figure 2:
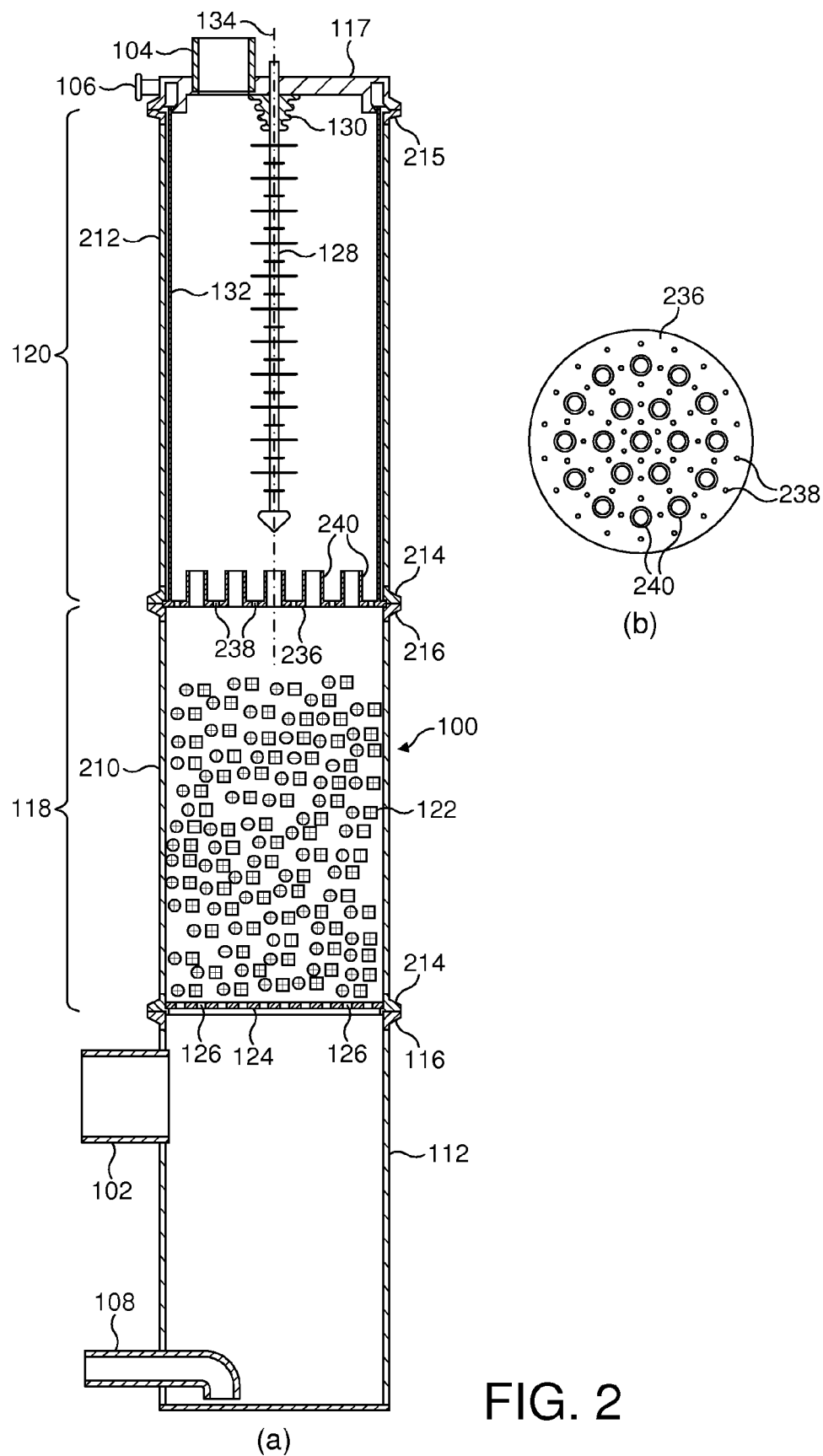
FIG. 2(a) illustrates a vertical cross-section through a second embodiment of an apparatus for treating gas.
FIG. 2(b) illustrates a top view of a partition of the apparatus of FIG. 2(a)
Figure 3:
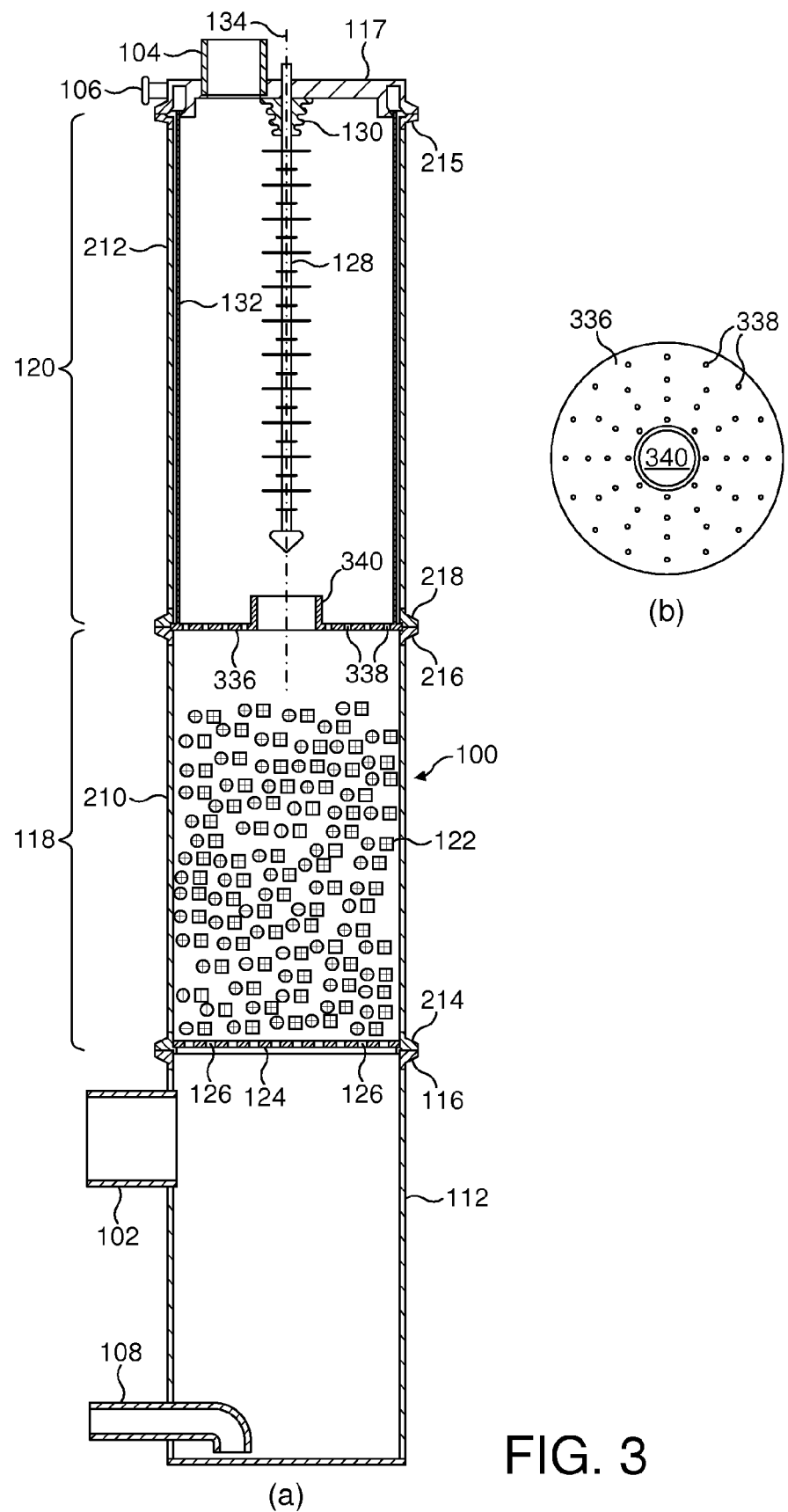
FIG. 3(a) illustrates a vertical cross-section through a third embodiment of an apparatus for treating gas.
FIG. 3(b) illustrates a top view of a partition of the apparatus of FIG. 3(a)
Figure 4:
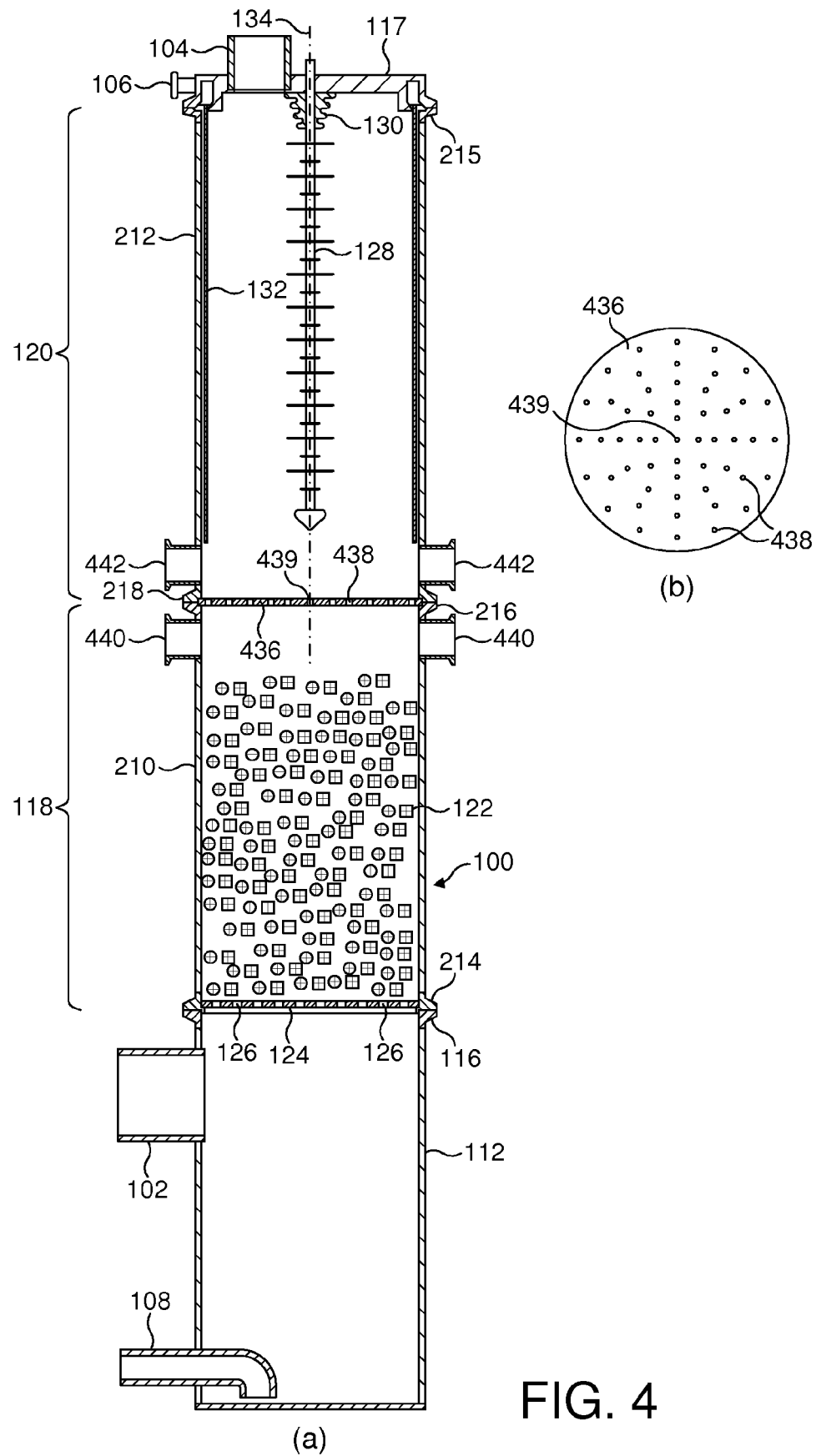
FIG. 4(a) illustrates a vertical cross-section through a fourth embodiment of an apparatus for treating gas.
FIG. 4(b) illustrates a top view of a partition of the apparatus of FIG. 4(a)
Figure 5:
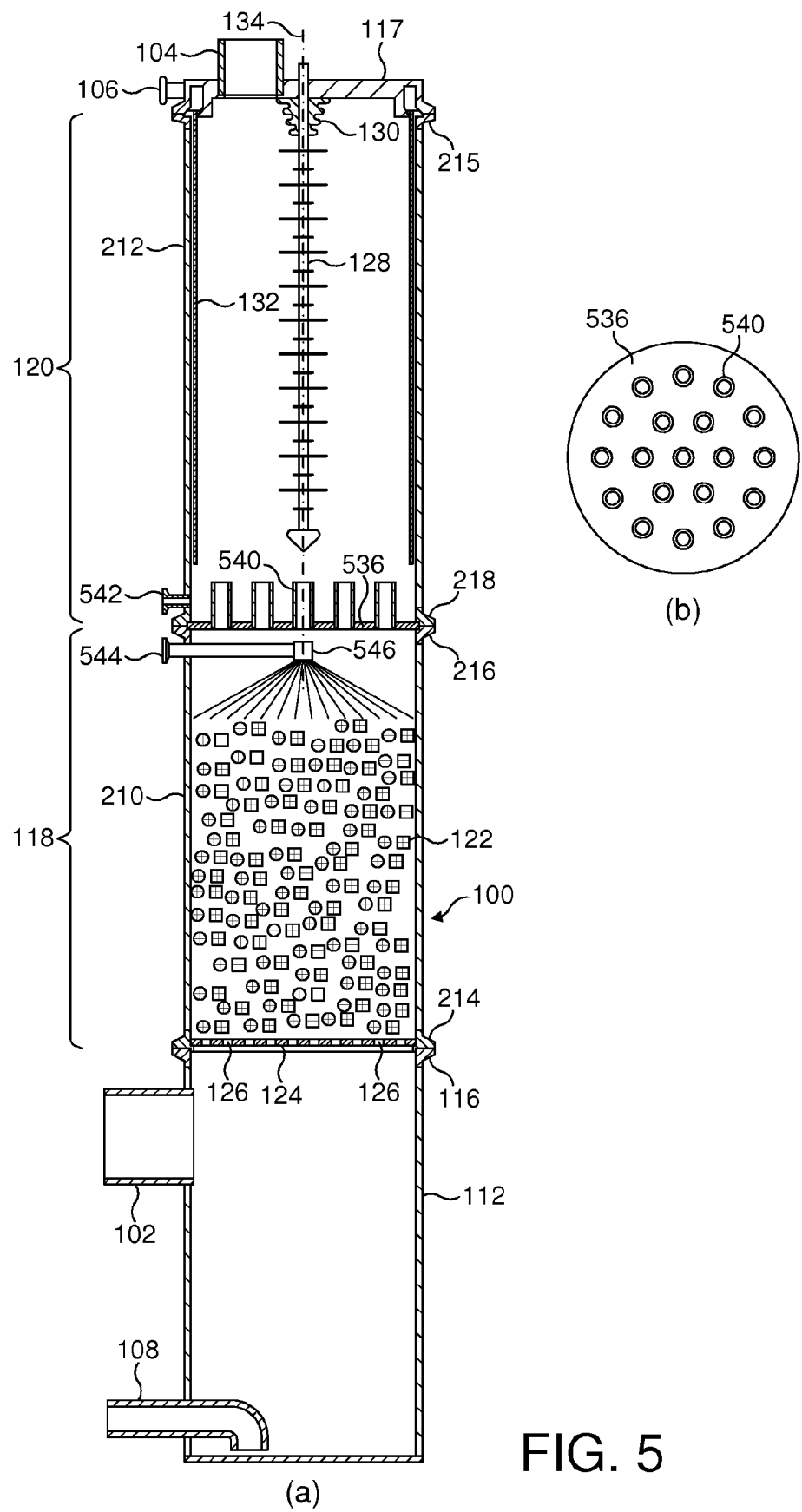
FIG. 5(a) illustrates a vertical cross-section through a fifth embodiment of an apparatus for treating gas.
FIG. 5(b) illustrates a top view of a partition of the apparatus of FIG. 5(a)

FIG. 2(a) illustrates a second embodiment of an apparatus for treating gas. This second embodiment is similar to the first embodiment illustrated in FIG. 1, and so the same references numerals have been used to indicate features of the second embodiment which are the same as those of the first embodiment, and which will not be discussed further in connection with this second embodiment.

The second embodiment differs from the first embodiment in that the first component 110 of the first embodiment has been replaced by a scrubbing section component 210 and a precipitator section component 212. The scrubbing section component 210 houses the scrubbing section 118 of the casing 100, and the precipitator section component 212 houses the precipitator section 120 of the casing. The scrubbing section component 210 has a flanged bottom (as illustrated) end 214 which is connected to the flanged top end of component 112, and a flanged top end 216 which is connected to a flanged bottom end 218 of the precipitator section component 212.

The lid 117 is secured to the flange 215 of the open upper end of the precipitator section component 212. As in the first embodiment, the upper open end of the outer electrode 132 is welded to a flange or collar, which is located in a groove cut in the flange 215 of the precipitator section component 212 of the casing 100 so that the outer electrode 132 hangs from the flange 215 into the casing 100.

The second embodiment also differs from the first embodiment in that the partition 136 is replaced by a partition 236 clamped or otherwise held between the section components 210, 212 of the casing 100. The partition 236 may be formed from plastics material. As illustrated in FIGS. 2(a) and 2(b), similar to the partition 136 of the first embodiment the partition 236 comprises a plurality of apertures 238 through which the scrubbing liquid drains from the precipitator section 120 into the scrubbing section 118. These apertures 238 are arranged in a number of concentric circular arrays (three in this embodiment) extending about the longitudinal axis of the casing 100 so that the packing material of the packed tower is relatively evenly showered with scrubbing liquid draining from the precipitator section 120. The partition also comprises a plurality of pipes 240 extending from the partition 236 into the precipitator section 120 above the maximum level for the scrubbing liquid forming on the partition 236. These pipes 240 may also be arranged in a number of concentric circular arrays (two in this embodiment) extending about the longitudinal axis of the casing 100. As illustrated in FIG. 2(b), an aperture 238 may be provided between adjacent pipes 240 in a circular array.

FIGS. 3 to 7 illustrate respectively third to seventh embodiments of an apparatus for treating a gas stream. Each of these embodiments is based on the second embodiment illustrated in FIG. 2(a), and so the same references numerals have been used to indicate features of these embodiments which are the same as those of the second embodiment, and which will not be discussed further.

Turning first to FIGS. 3(a) and 3(b), in the third embodiment of an apparatus for treating gas, the partition 236 of the second embodiment is replaced by a partition 336 having a single, centrally located pipe 340 for conveying gas from the scrubber section 118 to the precipitator section 120. Four concentric arrays of apertures 338 are located in the partition 336 about the pipe 340 for conveying scrubbing liquid from the precipitator section 120 to the scrubbing section 118.

FIGS. 4(a) and 4(b) illustrate a fourth embodiment of an apparatus for treating gas. In this fourth embodiment, the partition 236 of the second embodiment is replaced by a partition 436 having five concentric arrays of apertures 438 for conveying scrubbing liquid from the precipitator section 120 to the scrubber section 118, and a similar, central aperture 439. To enable gas to be transferred from the scrubber section 118 to the precipitator section 120, the scrubber section component 210 is provided with a plurality of gas outlets 440 towards the upper (as illustrated) end thereof, and the precipitator section component 212 is provided with a plurality of gas inlets 442 towards the lower (as illustrated) end thereof. External piping (not shown) connecting the gas outlets 440 to the gas inlets 442 conveys the scrubbed gas from one section to the other.

FIGS. 5(a) and 5(b) illustrate a fifth embodiment of an apparatus for treating gas. In this fifth embodiment, the partition 236 of the second embodiment is replaced by a partition 536 having a plurality of pipes 540 extending from the partition 536 into the precipitator section 120 above the maximum level for the scrubbing liquid that will settle on the partition 536 during use. To enable scrubbing liquid to be transferred from the precipitator section 120 to the scrubber section 118, the precipitator section component 212 is provided with a scrubbing liquid outlet 542 located towards the lower (as illustrated) end thereof and beneath the tops of the pipes 540. The scrubber section component 210 is provided with a scrubbing liquid inlet 544 towards the upper (as illustrated) end thereof. External piping (not shown) connecting the scrubbing liquid outlet 542 to the scrubbing liquid inlet 544 conveys the scrubbing liquid from one section to the other. A liquid pump may be provided in that piping to pump the scrubbing liquid from the precipitator section 120 and to generate sufficient pressure within the pumped scrubbing liquid to generate a spray of scrubbing liquid from a nozzle 546 of the scrubbing liquid inlet 544 on to the packing material of the scrubber section 118.

Figure 6:
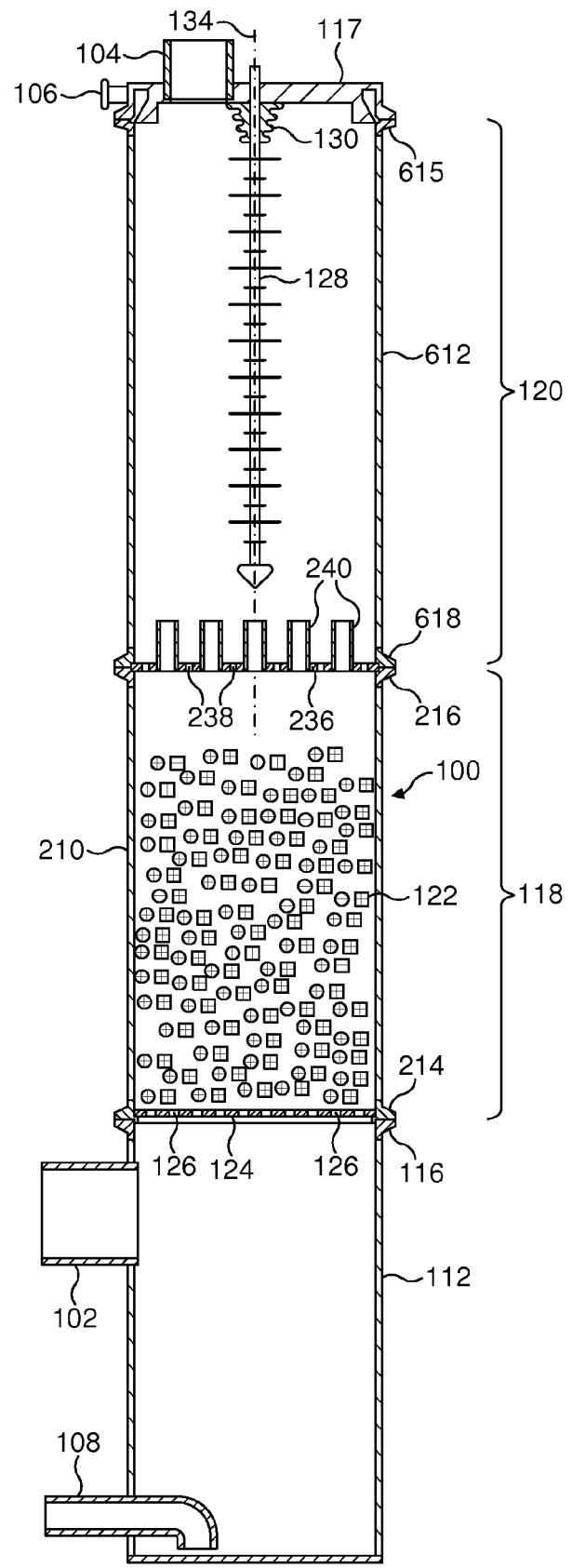
FIG. 6 illustrates a vertical cross-section through a sixth embodiment of an apparatus for treating gas.
Figure 7:
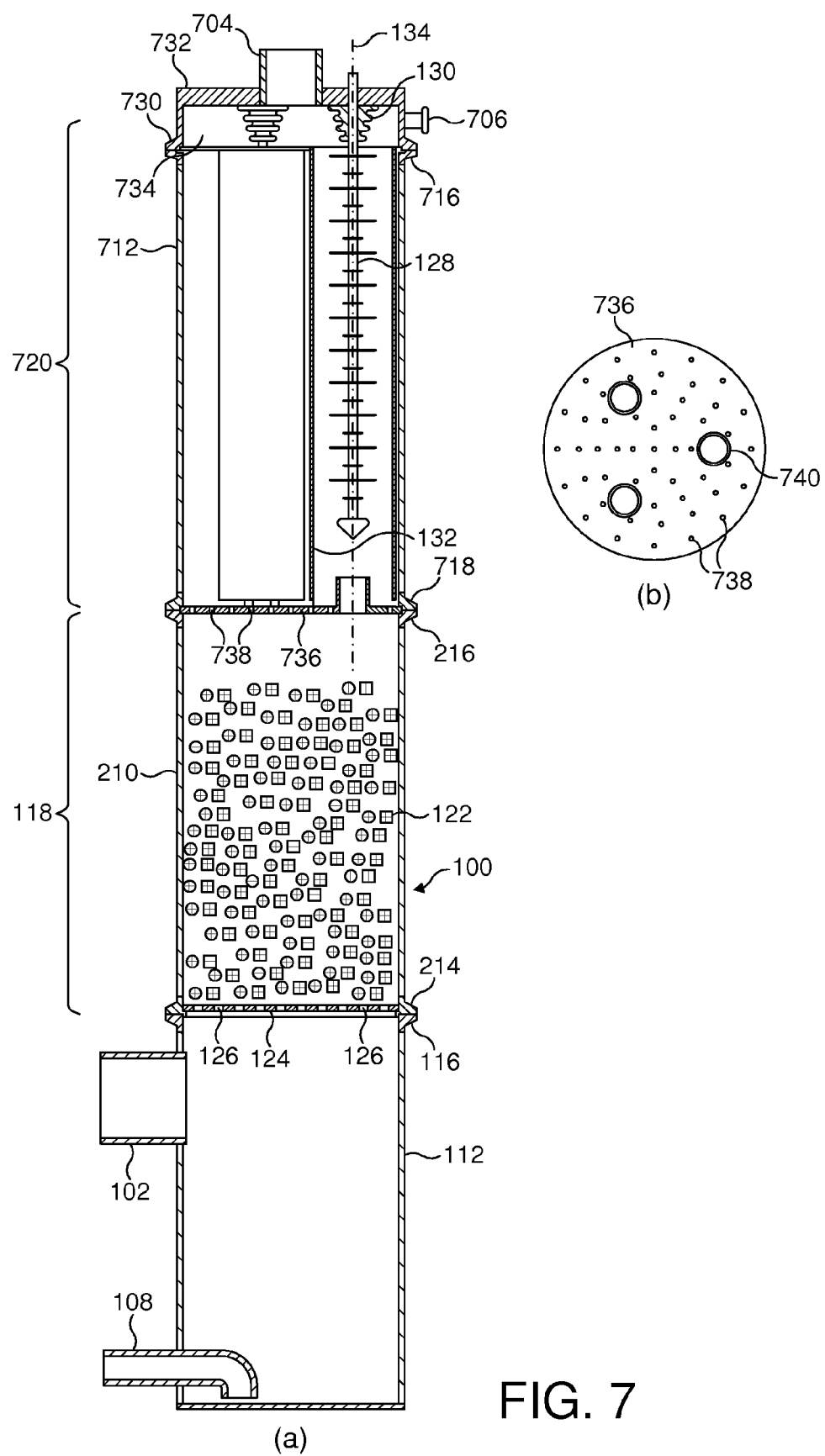
FIG. 7(a) illustrates a vertical cross-section through a seventh embodiment of an apparatus for treating gas.
FIG. 7(b) illustrates a top view of a partition of the apparatus of FIG. 7(a)

FIG. 6 illustrates a sixth embodiment of an apparatus for treating gas. In this sixth embodiment, the precipitator section component 212 of the casing 100 is replaced by an electrically conductive precipitator section component 612 having a flanged bottom (as illustrated) end 618 connected to the flanged open end 216 of the scrubbing section component 210 of the casing 100. This enables the precipitator section component 612 of the casing 100 to act as the outer electrode of the precipitator section 120, thereby removing the need to provide an electrically conductive sleeve 132 surrounding the inner electrode 128.

FIGS. 7(a) and 7(b) illustrate a seventh embodiment of an apparatus for treating gas. In this seventh embodiment, the precipitator section component 212 is replaced by a precipitator section component 712 containing a plurality (in this example three) precipitator sections 720 positioned to receive gas from the scrubbing section 118. The component 712 has a flanged bottom (as illustrated) end 718 connected to the flanged top (as illustrated) end 216 of the scrubbing section component 210 of the casing 100, and a flanged top end 716 connected to a flanged bottom end 730 of a cover component 732 of the casing 100, which replaces the lid 117 of the second embodiment. The cover component 732 comprises a gas outlet 704 for exhausting gas from the precipitator sections 720. A gas manifold 734 formed in the cover component 732 conveys gas from the precipitator sections 720 to the gas outlet 704. The cover component 732 further comprises a scrubbing liquid inlet 706 for supplying scrubbing liquid to each of the precipitator sections 720.

The precipitator sections 720 are arranged side by side in parallel to receive gas from the scrubbing section 118. Each of the precipitator sections 720 comprises an inner electrode 128 held in a holder 130 located in the cover component 732, and an outer electrode 132 extending about the inner electrode 128. The upper open end of the outer electrode 132 is welded to a flange or collar, which is located in a groove cut in the flange 716 of the precipitator section component 712 of the casing 100 so that each outer electrode 132 hangs from the flange 716 into the casing 100.

The partition 236 of the second embodiment is replaced by a partition 736 comprises a plurality of apertures 738 through which the scrubbing liquid drains from the precipitator sections 720 into the scrubbing section 118. These apertures 238 are arranged in a number of concentric circular arrays (five in this embodiment) extending about the longitudinal axis of the casing 100 so that the packing material of the packed tower is relatively evenly showered with scrubbing liquid draining from the precipitator sections 720. The partition also comprises a plurality of pipes 740, one for each precipitator section 720 and each extending from the partition 736 into a respective precipitator section 720 to convey scrubbed gas in parallel into the precipitator sections 720. Each pipe 740 is substantially concentric with the outer electrode 132 of its precipitator section 720.

Figure 8:
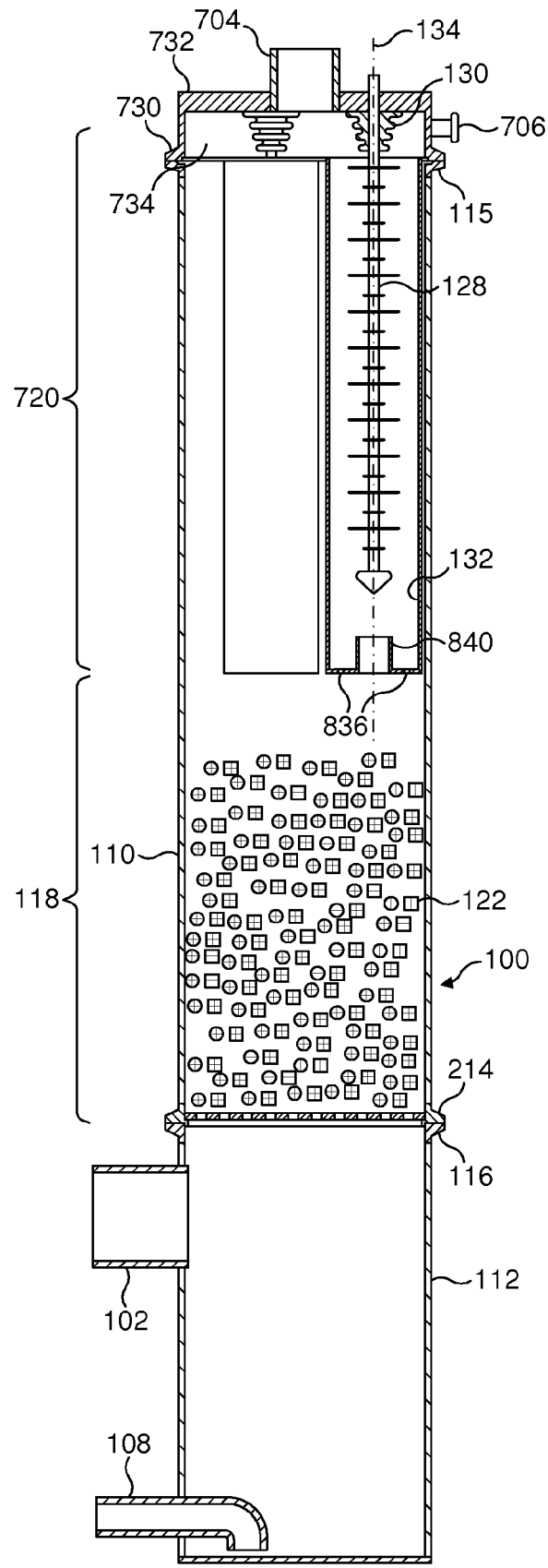
FIG. 8 illustrates a vertical cross-section through an eighth embodiment of an apparatus for treating gas.

FIG. 8 illustrates an eighth embodiment of an apparatus for treating gas. This eighth embodiment is similar to the seventh embodiment illustrated in FIG. 7(a), and so the same references numerals have been used to indicate features of the eighth embodiment which are the same as those of the seventh embodiment, and which will not be discussed further in connection with this eighth embodiment.

In this eighth embodiment, the scrubbing section component 210 and the precipitator section component 712 of the casing 100 are replaced by the first component 110 of the casing 100 of the first embodiment illustrated in FIG. 1. The partition 736 of the seventh embodiment is replaced by a plurality of electrically conductive partitions 836, one for each precipitator section 720 and each welded or otherwise connected to the open bottom (as illustrated) end of the outer electrode 132 of its precipitator section 720. Each partition 836 comprises a circular array of apertures 838 through which the scrubbing liquid drains from the precipitator section 720 into the scrubbing section 118. The partition 836 also comprises a pipe 840 extending from the partition 836 into the precipitator section 720 to convey scrubbed gas into the precipitator section 720. The pipe 840 is substantially concentric with the outer electrode 132 of the precipitator section 720.

Figure 9:
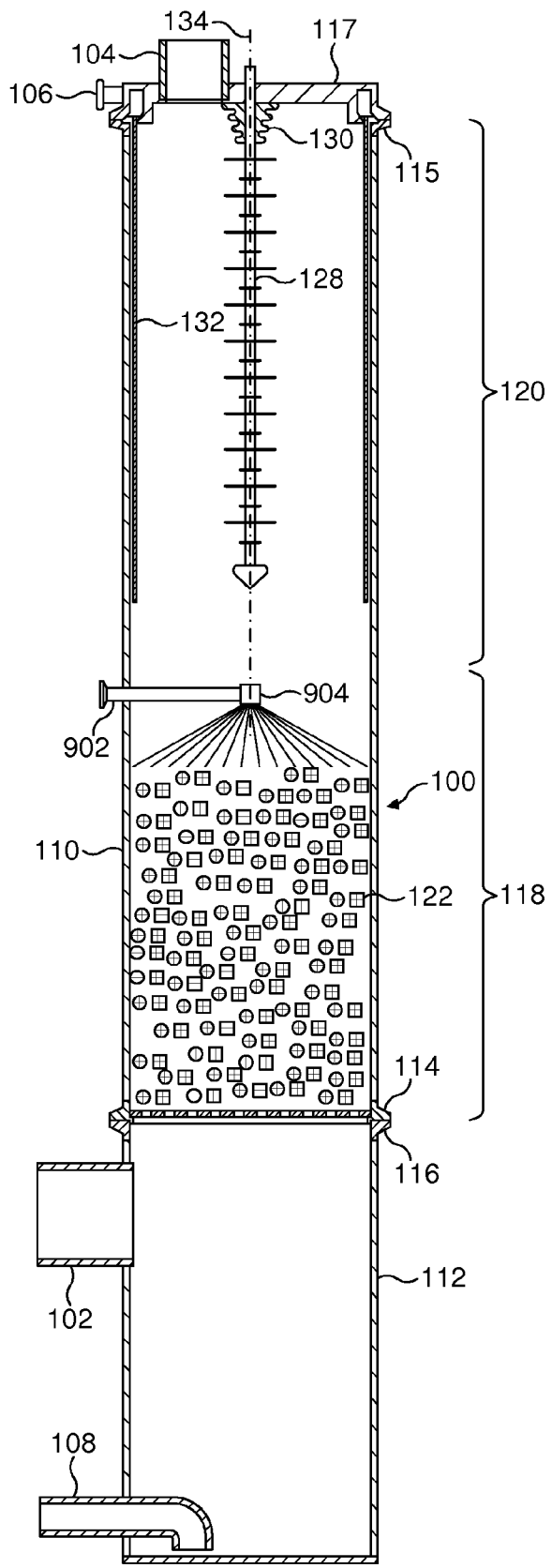
FIG. 9 illustrates a vertical cross-section through a ninth embodiment of an apparatus for treating gas

FIG. 9 illustrates a ninth embodiment of an apparatus for treating gas. This ninth embodiment is similar to the first embodiment illustrated in FIG. 1, and so the same references numerals have been used to indicate features of the ninth embodiment which are the same as those of the first embodiment, and which will not be discussed further in connection with this ninth embodiment.

The ninth embodiment differs from the first embodiment in that the partition 136 of the first embodiment has been removed so that gas passes freely from the scrubber section 118 to the precipitator section 120, and so that scrubbing liquid passes freely from the precipitator section 120 to the scrubber section 118. As this would result in a relatively uneven irrigation of the packing material 122 of the packed tower, with the outermost packing material being irrigated much more than the innermost packing material, an additional scrubbing liquid inlet 902 is provided in the casing 100 for supplying additional scrubbing liquid to at least the central portion of the scrubber section 118. As illustrated in FIG. 9, a nozzle 904 may be provided for spraying the additional scrubbing liquid on to the packing material 122 of the packed tower.

Figure 11:
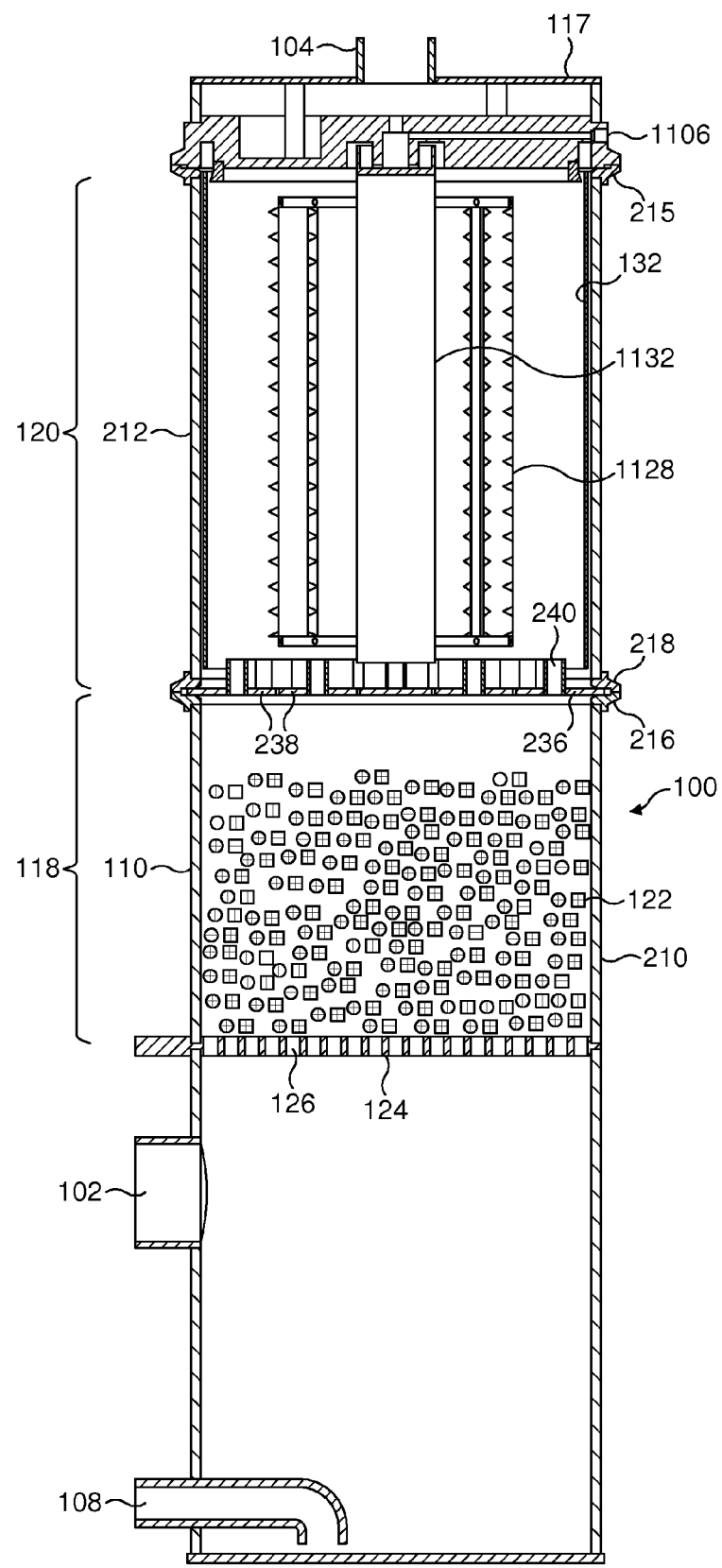
FIG. 11 illustrates a vertical cross-section through a tenth embodiment of an apparatus for treating a gas stream.

Finally, FIG. 11 illustrates a tenth embodiment of an apparatus for treating a gas stream. This embodiment is based on the second embodiment illustrated in FIG. 2(*a*), and so the same references numerals have been used to indicate features of these embodiments which are the same as those of the second embodiment, and which will not be discussed further.

In this tenth embodiment, the precipitator section component 212 differs from that of the second embodiment in that it comprises a centrally located, inner collection electrode 1132 and an outer collection electrode 132 with a high voltage electrode assembly 1128 mounted co-axially between the inner and outer collection electrodes 1132, 132.

The outer collection electrode 132 is, as in the second embodiment, welded into to a flange or collar, which is located in a groove cut in the flange 215 of the precipitator section component 212 of the casing 100.

The inner collection electrode 1132 is a substantially cylindrical metal tube welded into a collar located in a groove cut into the lid 117 so that the inner collection electrode extends into the precipitator 120. The inner collection electrode 1132 has a water feed inlet 1106 for receiving scrubbing liquid.

The high voltage electrode assembly 1128 is mounted in electrically insulating holders (not shown) depending from the lid 117 so that the high voltage electrode assembly 1128 extends into the precipitator section 120 co-axially between the inner and outer collection electrodes 1132, 132; co-axially surrounded by the outer collection electrode 132 and co-axially surrounding the inner collection electrode 1132. The electrode assembly 1128 is preferably of annular form surrounding the inner collection electrode 1132 at its axis, but may also be, for example, hexagonal or pentagonal.

In use, the outer and inner collection electrodes 132, 1132 are maintained at electrical ground (0 V). The high voltage electrode assembly 1128 is connected to a power supply (not shown) for applying an electric potential of, for example, 20-50 kV between the high voltage electrode assembly 1128 and the inner and outer collection electrodes 1132, 132. The scrubbing liquid inlet 106 is arranged to supply scrubbing liquid tangentially into the top of the outer collection electrode 132 to generate a curtain or "swirl" of scrubbing liquid about the inner wall of the outer electrode 132. The scrubbing liquid inlet 1106 is arranged to supply scrubbing liquid to the top of the inner collection electrode 1132 to generate a curtain of scrubbing liquid about the exterior wall of the outer electrode 1132.

The tenth embodiment either enables higher volumetric capacity of the precipitator section 120 without increasing the excitation voltage of the precipitator unit 120 to impractical values, or enables efficient scrubbing in a horizontally smaller precipitator section 120.

In summary, an apparatus for treating gas comprises a casing containing a gas scrubber section and an electrostatic precipitator section located above the scrubber section. A partition may be located within the casing to separate the precipitator section from the scrubber section. The casing has a gas inlet for supplying gas to the scrubber section, a gas outlet for exhausting gas from the precipitator section, a scrubbing liquid inlet for supplying scrubbing liquid to the precipitator section, and a scrubbing liquid outlet for draining scrubbing liquid from the scrubber section. In one embodiment the partition comprises a set of gas passages for conveying gas from the scrubber section to the precipitator section, and a set of apertures through which scrubbing liquid drains from the precipitator section into the scrubber section.

We claim:

1. An apparatus for treating gas comprising acid gases and particulates, the apparatus comprising:
    a casing;
    a gas scrubber section located within the casing, the casing having a gas inlet for supplying gas to the gas scrubber section;
    an electrostatic precipitator section positioned within the casing to receive gas from the gas scrubber section, the casing having a gas outlet for exhausting gas from the electrostatic precipitator section and a scrubbing liquid inlet for supplying scrubbing liquid to the electrostatic precipitator section, wherein the scrubbing liquid inlet is located toward the upper end of the casing; and
    a partition disposed between the gas scrubber section and the electrostatic precipitator section and comprising means for conveying scrubbing liquid from the precipitator section to the gas scrubber section,
    wherein the gas scrubber section comprises a packed tower scrubber section positioned directly beneath the electrostatic precipitator section within the casing and receives scrubbing liquid only from the electrostatic precipitator section via the means for conveying scrubbing liquid from the precipitator section to the gas scrubber section, the casing having a scrubbing liquid outlet for draining scrubbing liquid from the gas scrubber section.

2. The apparatus of claim 1, wherein the casing comprises a plurality of interconnected components, and wherein the gas scrubber section and the electrostatic precipitator section are located within a common component of the casing.

3. The apparatus of claim 1, wherein the casing comprises a plurality of interconnected components, and wherein the gas scrubber section and the electrostatic precipitator section are located within respective ones of the interconnected components of the casing.

4. The apparatus of claim 2, wherein the component of the casing within which the electrostatic precipitator section is positioned comprises at least part of an electrode of the electrostatic precipitator section.

5. The apparatus of claim 1, wherein the casing is tubular.

6. The apparatus of claim 5, wherein the scrubbing liquid inlet is arranged to supply scrubbing liquid tangentially into the electrostatic precipitator section.

7. The apparatus of claim 1, wherein the partition is connected to an electrode of the electrostatic precipitator section.

8. The apparatus of claim 1, wherein the casing further comprises at least a first component and a second component, and wherein the partition is held between the first component and the second component.

9. The apparatus of claim 1, further comprising means for conveying gas from the gas scrubber section around the partition to the electrostatic precipitator section.

10. The apparatus of claim 9, wherein the partition comprises the means for conveying gas from the gas scrubber section to the electrostatic precipitator section.

11. The apparatus of claim 1, wherein the means for conveying scrubbing liquid from the electrostatic precipitator section to the gas scrubber section comprises a plurality of apertures formed in the partition.

12. The apparatus of claim 11, wherein the apertures are dispersed about the partition.

13. The apparatus of claim 11, wherein the plurality of apertures are configured to supply gas into the electrostatic precipitator section above the plurality of apertures.

14. The apparatus of claim 1, wherein each of the apertures comprises a pipe extending from the partition into the electrostatic precipitator section.

15. The apparatus of claim 1, wherein the partition is substantially planar.

16. The apparatus of claim 1, wherein the casing further comprises an additional scrubbing liquid inlet for supplying scrubbing liquid to the gas scrubber section.

17. The apparatus of 16, wherein the additional scrubbing liquid inlet is configured to spray scrubbing liquid into the gas scrubber section.

18. The apparatus of claim 1, wherein the electrostatic precipitator section comprises a plurality of electrostatic precipitator sections positioned in the casing to receive gas from the gas scrubber section.

19. The apparatus of claim 18, wherein the plurality of electrostatic precipitator sections are arranged to receive gas in parallel from the gas scrubber section.

20. The apparatus of claim 18, wherein the casing comprises a plurality of partitions for dividing the casing into the plurality of electrostatic precipitator sections.

21. The apparatus of claim 20, wherein each of the plurality of partitions comprises at least part of an electrode of its respective electrostatic precipitator section.

22. The apparatus of claim 1, further comprising a plurality of co-axial precipitator sections.

23. The apparatus of claim 1, wherein the casing is substantially cylindrical.

24. The apparatus of claim 1, further comprising only one recirculation loop that recycles scrubbing liquid from the scrubbing liquid outlet to the scrubbing liquid inlet.

* * * * *